July 28, 1925.  
C. H. CASPAR  
1,547,786  
PROCESS OF MAKING ALCOHOL REDUCED LIQUIDS  
Filed March 23, 1921
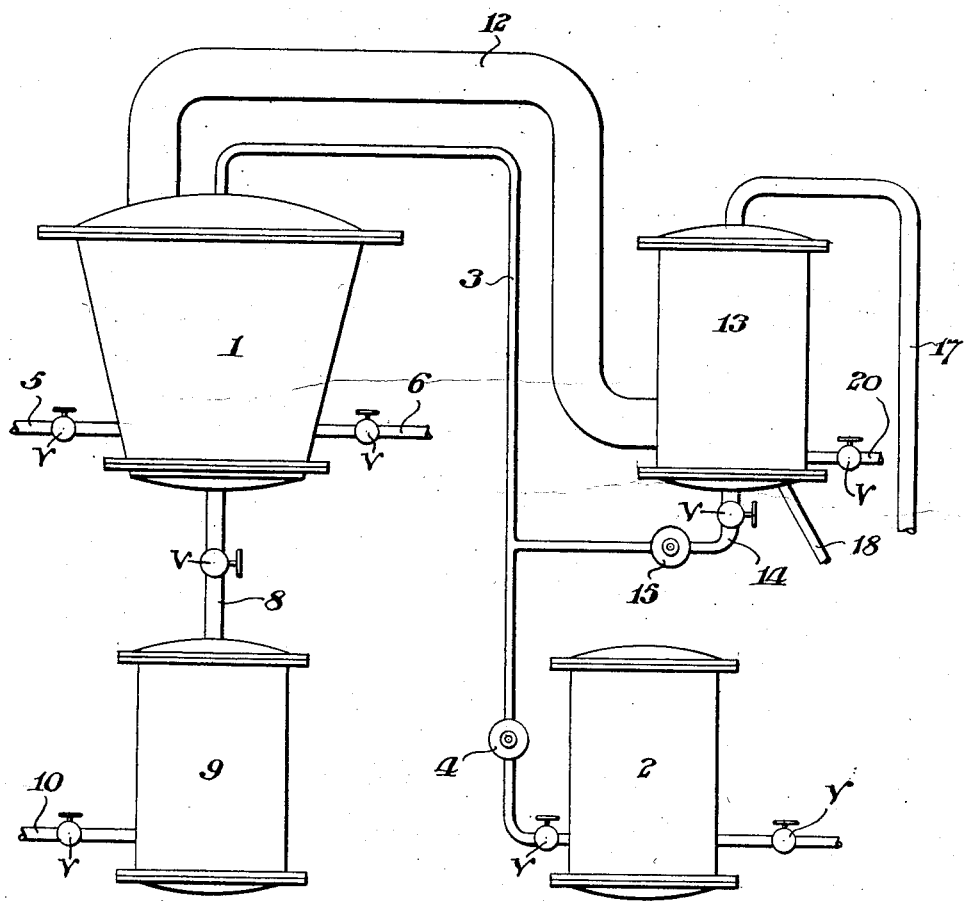
Witness  
R. H. Schleicher
Inventor:  
Charles H. Caspar,  
By Blount, Moulton & Hollis  
Attorneys.

Patented July 28, 1925.

1,547,786

UNITED STATES PATENT OFFICE.

CHARLES H. CASPAR, OF PHILADELPHIA, PENNSYLVANIA.

PROCESS OF MAKING ALCOHOL-REDUCED LIQUIDS.

Application filed March 23, 1921. Serial No. 454,795.

*To all whom it may concern:*

Be it known that I, CHARLES H. CASPAR, a citizen of the United States, and a resident of the city of Philadelphia, county of Philadelphia, and State of Pennsylvania, have invented certain new and useful Improvements in Processes of Making Alcohol-Reduced Liquids, of which the following is a specification, reference being had to the accompanying drawings.

My invention relates to the manufacture of alcohol-reduced liquids and more especially to beverages produced by brewing, such for example, as beer. It is well known that in the production of the latter with an alcoholic content of one-half of one per cent or less, it is customary to brew the beverage in the ordinary manner thereby producing an article containing from 3% to 4% of alcohol more or less and to then treat the beverage in some suitable way, generally by evaporation, to reduce the alcoholic content to the desired amount, it having been found impracticable to satisfactorily produce by the ordinary processes of brewing a beverage of desired flavor and having the other characteristics requisite for marketability, but with an alcoholic content of one-half of one per cent or less. The evaporating treatment referred to may be performed in numerous ways, for example, as disclosed in U. S. Letters Patent No. 1,286,315, granted December 3, 1918, to Herman Heuser for processes of making alcohol-reduced beverages, but such processes or treatments, whatever be their specific nature, are open to certain well recognized objections. Among these may be mentioned the necessity, in order to effect the desired reduction in alcoholic content, of evaporating along with the alcohol a relatively large proportion of the other ingredients resulting in a marked reduction in the volume of the liquid being treated, which is ordinarily made up by adding a "make-up" liquid after the completion of the evaporating process in an amount sufficient to restore the original volume. Obviously as this liquid must be substantially devoid of alcohol and hence manufactured by some process other than the ordinary process of brewing, the flavor and characteristics of the dealcoholized beverage becomes impaired, while additionally the losses due to evaporation of the brewed beverage and the expense of the "make-up" liquid materially enhance the cost of the finished product.

The principal object of my invention is to provide a process whereby the alcoholic content of a liquid and more especially a beverage such as beer, may be reduced to substantially any desired point without reducing the volume thereof by an amount substantially greater than the amount of alcohol abstracted therefrom, thus avoiding the necessity of "making-up" the product after treatment with its resulting disadvantages. A further object of my invention is to effect the concentration and recovery of the alcohol evaporated during the treatment of the liquid substantially simultaneously therewith and without additional treatment by separate recovery or concentrating processes, so as to render the same readily salable as a commercial product, and therefore a source of profit instead of a source of loss, as is frequently the case in alcohol-reducing processes as at present practised.

My invention further includes all of the other various novel objects, steps, features and advantages hereinafter more fully set forth, described and claimed.

I have found that when a liquid containing alcohol is subjected to an evaporating treatment either at atmospheric pressure or at pressures above or below atmospheric, the alcoholic content may be reduced to one-half of one per cent or less if desired by evaporating a substantially fixed percentage of the liquid, ordinarily not over 30%, whatever be the initial amount of alcohol contained therein. More specifically, if for example, 100 barrels of liquid containing initially 4% of alcohol are subjected to an evaporating treatment until the liquid contains but one-half of one per cent thereof, it will be found that the total volume of the liquid has ordinarily been reduced from 25% to 30%, and that the same result will be obtained if the same quantity of liquid but initially containing, for example, 10% of alcohol be treated. By taking advantage of this fact, I am enabled to obtain the objects and results to which reference has already been made.

In order to enable those skilled in the art to more readily comprehend my invention I have diagrammatically illustrated in the accompanying drawing an apparatus suitable for the performance of my improved process, the same being of the general type disclosed and described in detail in the said patent to Heuser, No. 1,286,315, with certain slight modifications, although it will be understood that the performance of the process is in no wise dependent on the use of any particular apparatus as the same may be of any suitable type and construction effective for bringing about the evaporation of the liquid to be treated and the condensation of the vapors driven off therefrom during the treatment.

In the said drawing 1 indicates a suitable evaporating vessel to which the liquid to be evaporated is conducted from a storage tank 2 through an inlet pipe 3, a pump 4 being employed if necessary to effect transfer of the liquid. Heat may be supplied to the evaporating vessel in any convenient manner preferably by steam conducted to the jacket thereof through the medium of the pipe 5 and discharged, either before or after condensation, by a pipe 6. A pipe 8 connects the lower part of the evaporating vessel with a receiving tank 9 and serves as a means for conducting the liquid after treatment in the vessel to the receiving tank from which it may be drawn off as desired through a pipe 10. The upper part of the evaporating vessel is connected by the vapor pipe 12 with a condenser 13 preferably of the surface type or such other type as will conveniently effect the condensation of the vapors and their collection as condensate or "low wines" in the bottom of the condenser casing which is connected through a pipe 14 with the inlet pipe 3 or storage tank 2, a pump 15 being preferably arranged in the pipe 14 in such manner as to effect the discharge of the low wines from the condenser casing into the inlet pipe or storage tank. The pipes 17 and 18 respectively serve to conduct the condensing fluid to and from the condenser and a drain pipe 20 may be provided adjacent the bottom of the condenser casing through which the condensate may be drawn off when desired. Valves V are positioned at suitable points in the various pipes to effect regulation of the flow of the liquids therethrough.

It will be noted that the apparatus so diagrammatically illustrated is substantially similar to that disclosed and described in the said Heuser patent with the exception that a surface condenser instead of a barometric condenser is preferably employed and that means including the pipe 14 and pump 15 are provided for returning the condensate or low wines which collect in the condenser casing to the evaporating vessel along with the fresh liquid drawn from the storage tank 2.

In the treatment of a given quantity of alcohol-containing liquid in the old way in an apparatus of this general character and assuming the valve in pipe 14 to be closed so as to retain the condensate in the condenser casing, it is found that if, for example, 100 barrels of liquid be drawn from the storage tank 2 and passed through the apparatus, about 75 barrels of liquid containing substantially .4% of alcohol will finally be recovered in the receiving tank 9, and assuming further that the liquid initially contained 3% of alcohol the condensed vapors collected in the casing of the condenser 13 will amount to substantially 25 barrels, of which some 2.7% barrels represent the alcohol contained therein or approximately 12% of the total volume, providing there has been no substantial losses during the process by reason of leakage or the like. Under these conditions it is customary in commercial practice to make up the volume of the liquid contained in the receiving tank 9 to substantially 100 barrels by the addition of 25 barrels of any desired make-up liquid and, under some conditions, to separately treat the low wines or condensate in such manner as to recover as much of the alcohol contained therein as possible in a commercially salable form.

In the carrying out of my improved process instead of either throwing away the condensate or subjecting it to further treatment to extract the contained alcohol, I return the condensate through the medium of the pipe 14 and pump 15 or in any other suitable way to mingle with the next incoming batch of liquid as the latter is drawn from the storage tank 2, the volume of this second batch and of subsequent batches being preferably reduced by an amount substantially equal to the quantity of low wines drawn from the condenser casing and mixed therewith. For example, after the treatment of the first hundred barrels already described, a batch of approximately 75 barrels of the fresh liquid containing 3% of alcohol may be drawn from the storage tank 2 and mingled with the approximately 25 barrels of condensate derived from the treatment of the first batch, thereby giving an aggregate of substantially 100 barrels in the second batch with an average alcoholic content of substantially 5.2% owing to the admixture of the 12% concentrate with the 3% fresh liquid.

After the evaporating treatment of this second batch of mingled concentrate and fresh liquid has been effected, it will ordinarily be found that substantially 75 barrels of treated liquid containing substantially .4% of alcohol will have collected in the receiving tank 9 and substantially 25 barrels of condensate or low wines containing substantially 25% of alcohol will have collected in the condenser casing. By again returning this relatively highly alcoholic condensate to a fresh batch of 75 barrels of 3% liquid drawn from the storage tank 2 and again subjecting this mixture of 100 barrels to the evaporating treatment, an additional 75 barrels of .4% liquid will be found to have collected in the receiving tank 9 and substantially 25 barrels of condensate or low wines having an alcoholic content of substantially 40% in the condenser casing.

By again adding 75 barrels of fresh 3% liquid and repeating the cycle, the alcoholic content of the low wines or condensate may be raised to some 65% while the treated liquid collected in the receiving tank 9 still maintains an alcoholic content of substantially only .4%. When this point is reached the condensate is ordinarily considered as a commercially salable product and may be withdrawn either in whole or in part from the condenser by the pipe 20 and sold for utilization in the arts, while at any time the liquid in the receiving tank 9 may be drawn off for immediate use or such further treatment as may be desired.

It will be understood that the figures and percentages given in the foregoing examples are only approximate and that the same may vary considerably with different forms of apparatus and with different apparatus of the same form, by reason of local conditions affecting the efficiency of any given installation or from other causes, so that it will sometimes be requisite to continue the cyclic process for a longer time to obtain a condensate of given alcoholic content than at others, or with another form of apparatus, a matter which, however, may readily be determined by suitable tests of the condensate from time to time.

While in the foregoing description of one manner of performing my invention I have referred to the reduction of the alcoholic content of successive batches of alcohol-containing liquid, it will of course be understood that in practice the fresh liquid need not ordinarily be drawn in consecutive fixed amounts from the storage tank 2 and passed through the evaporating treatment but the liquid to be treated may be drawn continuously from the storage tank and the condensate or low wines admixed therewith during its passage to the evaporating vessel as fast as the low wines collect in the condenser, so that instead of the alcoholic content of the low wines increasing in certain stated amounts, the increase will be effected gradually and the process continued until the low wines contain sufficient alcohol, as ascertained by test, to render them commercially available for any desired purpose, when all or a suitable portion thereof may be drawn off without interruption of the process if desired.

It will be further understood that the particular method of evaporation or condensation utilized in carrying out the process is immaterial as any of the well known methods may be employed successfully, and the evaporation effected either at atmospheric pressure or above or below atmospheric pressure as may be desired. Additionally, the particular form of apparatus employed may be varied from that diagrammatically shown herein without in any way interfering with the successful operation of the process so long as the apparatus is effective to bring about the admixture of the condensed low wines with the incoming fresh liquid prior to its entrance to the evaporating vessel and the condensation and recovery of the vapors which are given off as the liquid is evaporated.

Furthermore, while my improved process may be successfully employed in the reduction of the alcoholic content of such alcohol containing liquids as are capable of having their alcoholic content reduced by evaporation, it is more especially adapted for the reduction of the alcoholic content of fermented brewed and malted liquids and beverages and its use is principally contemplated for that purpose though not confined thereto.

Having thus described my invention I claim and desire to protect by Letters Patent of the United States:

1. The steps in the process of manufacturing alcohol-reduced liquids by evaporation which consists in evaporating a sufficient quantity of the liquid to effect the desired reduction in alcoholic content, condensing the products of evaporation and admixing said products with fresh liquid prior to its treatment in the evaporating vessel.

2. A cyclic process of manufacturing alcohol-reduced liquids by evaporation which consists in evaporating the liquid to be treated in a suitable evaporator, condensing the products of evaporation and returning the condensate to fresh liquid prior to its introduction to the evaporator.

In witness whereof, I have hereunto set my hand this 22d day of March, A. D. 1921.

CHARLES H. CASPAR.